United States Patent
Fukui et al.

(10) Patent No.: US 9,027,285 B2
(45) Date of Patent: May 12, 2015

(54) METHOD OF PRODUCING VEHICLE DOOR FRAME

(71) Applicants: Katsuhisa Fukui, Toyokawa (JP); Tadashi Mutoh, Toyohashi (JP); Atsuo Noda, Toyohashi (JP); Kazuyoshi Yokota, Gamagori (JP)

(72) Inventors: Katsuhisa Fukui, Toyokawa (JP); Tadashi Mutoh, Toyohashi (JP); Atsuo Noda, Toyohashi (JP); Kazuyoshi Yokota, Gamagori (JP)

(73) Assignee: Shiroki Corporation, Kanagawa (JP)

( * ) Notice: Subject to any disclaimer, the term of this patent is extended or adjusted under 35 U.S.C. 154(b) by 0 days.

(21) Appl. No.: 14/094,050

(22) Filed: Dec. 2, 2013

(65) Prior Publication Data

US 2014/0157602 A1    Jun. 12, 2014

Related U.S. Application Data

(60) Division of application No. 13/446,055, filed on Apr. 13, 2012, now abandoned, which is a continuation of application No. PCT/JP2010/067722, filed on Oct. 8, 2010.

(30) Foreign Application Priority Data

Oct. 14, 2009    (JP) ................................. 2009-237089

(51) Int. Cl.
*B60J 5/04*    (2006.01)
(52) U.S. Cl.
CPC .......... *B60J 5/0463* (2013.01); *Y10T 29/49622* (2015.01); *B60J 5/0402* (2013.01)
(58) Field of Classification Search
CPC ....... B60J 5/0463; B60J 5/0402; B23P 11/00; B23P 19/02; B23P 19/10; B23P 2700/50

USPC ........ 49/506, 502, 504, 440, 441, 428, 493.1, 49/414; 296/146.2, 146.5, 1.08
See application file for complete search history.

(56) References Cited

U.S. PATENT DOCUMENTS 5,317,835 A * 6/1994 Dupuy et al. .................... 49/441
5,396,733 A * 3/1995 Dupuy ............................ 49/441
(Continued)

FOREIGN PATENT DOCUMENTS

JP    02115681 A    4/1990
JP    10-35284 A    2/1998
(Continued)

OTHER PUBLICATIONS

International Search Report of PCT/JP2010/067722 (Dec. 24, 2010).

*Primary Examiner* — Katherine Mitchell
*Assistant Examiner* — Marcus Menezes
(74) *Attorney, Agent, or Firm* — Millen, White, Zelano & Branigan, P.C.

(57) ABSTRACT

A door frame and a frame body including a glass opposing portion, a design portion positioned on one side of the glass opposing portion on the vehicle exterior side, a tubular portion positioned on the other side of the glass opposing portion on the vehicle interior side, and a glass guide portion having a concave cross section surrounding the edge of the door glass. All portions are collectively structured as a single member who is continuous and uniform from the upper sash portion to the side sash portion. A corner portion is created by a bending process at a boundary between the upper sash portion and the side sash portion. The width of the design portion of the frame varies in at least one area along the length thereof and the design portion of the frame body is covered with an exterior member.

8 Claims, 10 Drawing Sheets

(56) References Cited

U.S. PATENT DOCUMENTS

| | | | |
|---|---|---|---|
| 6,119,405 A * | 9/2000 | Disson et al. | 49/502 |
| 6,394,529 B2 * | 5/2002 | Davis et al. | 296/146.16 |
| 6,416,113 B1 | 7/2002 | Page | |
| 6,557,304 B2 | 5/2003 | Ellis | |
| 6,641,204 B2 * | 11/2003 | Ogawa et al. | 296/146.9 |
| 7,581,354 B2 * | 9/2009 | Yamada | 49/479.1 |
| 7,762,021 B2 * | 7/2010 | Fujiwara et al. | 49/502 |
| 7,764,421 B2 | 7/2010 | Fujiwara et al. | |
| 7,891,137 B2 * | 2/2011 | Takeuchi et al. | 49/502 |
| 8,127,501 B2 * | 3/2012 | Nakao et al. | 49/502 |
| 8,424,953 B2 * | 4/2013 | Kawano et al. | 296/146.5 |
| 8,458,959 B2 * | 6/2013 | Ohtake et al. | 49/502 |
| 2001/0008058 A1 * | 7/2001 | Kawai et al. | 49/479.1 |
| 2002/0050064 A1 | 5/2002 | Furuse et al. | |
| 2004/0130179 A1 * | 7/2004 | Masunaga et al. | 296/146.5 |
| 2007/0048543 A1 * | 3/2007 | Fujiwara et al. | 428/595 |
| 2008/0116713 A1 | 5/2008 | Jun et al. | |
| 2009/0115220 A1 * | 5/2009 | Takeuchi et al. | 296/146.6 |
| 2011/0099912 A1 * | 5/2011 | Ohtake et al. | 49/502 |

FOREIGN PATENT DOCUMENTS

| | | |
|---|---|---|
| JP | 2003-312382 A | 11/2003 |
| JP | 2005-313697 A | 11/2005 |
| JP | 2007-137200 A | 6/2007 |
| WO | 2007/040237 A1 | 4/2007 |

* cited by examiner

METHOD OF PRODUCING VEHICLE DOOR FRAME

RELATED APPLICATION DATA

This is a continuation of International Application No. PCT/JP2010/067722, with an international filing date of Oct. 8, 2010, which is herein incorporated by reference in its entirety.

TECHNICAL FIELD

The present invention relates to a vehicle door frame structure and a method of producing the vehicle door frame.

BACKGROUND ART

FIG. 9 shows a front left door of a passenger vehicle, viewed from the vehicle exterior side. The door 50 is provided with a door panel 51 and a door frame 52 positioned on top of the door panel 51, and the area which is surrounded by the upper edge of the door panel 51 and the inner edge of the door frame 52 is defined as a window opening 53. A door glass 54 is installed in the window opening 53 to be movable up and down.

As shown in FIG. 10, a glass guide portion 55 having a U-shaped (concave-shaped) cross section which is open toward the window opening 53 is formed on the inner periphery of the door frame 52, and an outer peripheral edge of the door glass 54 enters the glass guide portion 55 when the door glass 54 closes the window opening 53. A glass run 56 made of an elastic material is fitted in and held by the glass guide portion 55, and the edge of the door glass 54 which has entered the glass guide portion 55 is elastically held by lips 56a and 56b of the glass run 56 therebetween from the vehicle interior side and the vehicle exterior side, respectively. Note that FIG. 10 shows the lips 56a and 56b in a free state, in which the lips 56a and 56b are in noncontact with the door glass 54; the lips 56a and 56b are elastically deformed in directions away from each other when contacting the door glass 54. The glass guide portion 55 is provided on the vehicle interior side with a side wall portion 55a which supports the lip 56a and provided on the vehicle exterior side with a side wall portion 55b which supports the lip 56b on the vehicle exterior side.

The door frame 52 is provided with an upper sash 57 which forms the upper edge of the door and a side sash 58 which extends upwards from the rear of the door panel 51. Although a cross-section structure of the side sash 58 is shown in FIG. 10, the upper sash 57 also has a similar door glass holding structure composed of the glass guide portion 55 and the glass run 56. In addition, it is sometimes the case that the width for holding the door glass 54 by the glass guide portion 55 (the amount of overlapping between the door glass 54 and the side wall portions 55a and 55b) in the upper sash 57 and the width for holding the door glass 54 by the glass guide portion 55 (the amount of overlapping between the door glass 54 and the side wall portions 55a and 55b) in the side sash 58 are made different from each other. For instance, in the side sash 58, it is sometimes required to enhance the retention capability by increasing the width for holding the door glass by the glass guide portion 55 so as to prevent the door glass 54 from vibrating and rattling in a half-open state, whereas in the upper sash 57 it is sometimes required to reduce the width for holding the door glass by the glass guide portion 55 (especially the side wall portion 55b) so as to narrow the width of the design portion outwardly exposed.

To satisfy such demands, in Patent Literature 1, a frame portion of the upper sash and a frame portion of the side sash are formed as separate members having mutually different glass-holding widths in the glass guide portion and joined to each other at a corner portion of the door frame which corresponds to the boundary between the upper sash and the side sash.

CITATION LIST

Patent Literature

Patent literature 1: Japanese Unexamined Patent Publication 2007-137200

SUMMARY OF THE INVENTION

Technical Problem

To form a frame which includes the glass guide portion from two separate members, one for the upper sash and the other for the side sash, and thereafter to join these two separate members to each other is costly and troublesome to produce, and reduction thereof has been desired. Accordingly, the present invention provides a vehicle door frame structure which is low in production cost, high in productivity, and superior in flexibility of the setting of the cross sectional shape of the frame at different portions in the lengthwise direction of the frame, especially in the width of the design portion.

Solution to Problem

The present invention provides a vehicle door frame structure which includes an upper sash portion that holds an upper edge of an upward/downward movable door glass, a side sash portion that holds a side edge of the door glass and a corner portion positioned at a boundary between the upper sash portion and the side sash portion, the vehicle door frame structure including a frame body which includes a glass-opposing portion that is opposed to an edge of the door glass, a design portion that is positioned on one side of the glass-opposing portion on a vehicle exterior side and a tubular portion that is positioned on the other side of the glass-opposing portion on a vehicle interior side, wherein the frame body is structured as a single member which is continuous from the upper sash portion to the side sash portion by forming a glass guide portion from the glass-opposing portion, the design portion and the tubular portion so that the glass guide portion has a concave-shaped cross section surrounding the edge of the door glass, by forming the tubular portion to have a uniform cross section over a range from the upper sash portion to the side sash portion, and by performing a bending process on the corner portion; and an exterior member which covers the design portion of each of the upper sash portion and the side sash portion of the frame body from the vehicle exterior side, wherein the frame body is configured such that a width of the design portion varies at at least one area along the length of the design portion.

In the frame body, by making the design portion in the glass guide portion formation area vary in width, variations can be given to the cross sectional shape of the glass guide portion, more specifically to the glass holding width. For instance, by making the width of the design portion in the glass guide portion formation area greater in the side sash portion than in the upper sash portion, the glass holding width can be increased in the side sash portion while the width of the design portion of the door frame can be reduced in the upper sash portion.

It is desirable to cut out the design portion at the corner portion between the upper sash portion and the side sash portion.

The present invention also provides a method of producing a vehicle door frame which includes an upper sash portion that holds an upper edge of an upward/downward movable door glass, a side sash portion that holds a side edge of the door glass and a corner portion positioned at a boundary between the upper sash portion and the side sash portion, the method including forming a frame body which is continuous from the upper sash portion to the side sash portion by forming a linear member from a metal plate which has a length extending at least from the upper sash portion to the side sash portion so that the linear member has an uniform cross sectional shape which includes a glass-opposing portion that is opposed to an edge of the door glass, a design portion that is positioned on one side of the glass-opposing portion on a vehicle exterior side, a tubular portion that is positioned on the other side of the glass-opposing portion on a vehicle interior side, and a glass guide portion which has a concave-shaped cross section surrounding the edge of the door glass by the glass-opposing portion, the design portion and the tubular portion; and by bending the linear member at the corner portion; performing a process of making a width of the design portion of the frame body vary at at least one area along length of the design portion; and covering the design portion of the frame body with an exterior member from the vehicle exterior side.

Advantageous Effects of the Invention

According to the present invention of the above, the production cost can be kept down and the productivity is excellent compared with a structure in which separate frames are joined to each other at a corner of the door because the body of the door frame that includes the design portion, the tubular portion, the glass-opposing portion and the glass guide portion is configured from the frame body that consists of a single member which is continuous from the upper sash portion to the side sash portion. In addition, the vehicle door frame structure according to the present invention is superior in ensuring the strength of the door frame. Additionally, an appropriate width of the design portion can be easily set for each portion of the frame by making the design portion in the frame body vary in width at at least one area along length of the design portion. For instance, by making the design portion in the glass guide portion formation area vary in width, variations can be given to the width for holding the door glass by the glass guide portion.

DESCRIPTION OF THE EMBODIMENT

Figure 1:
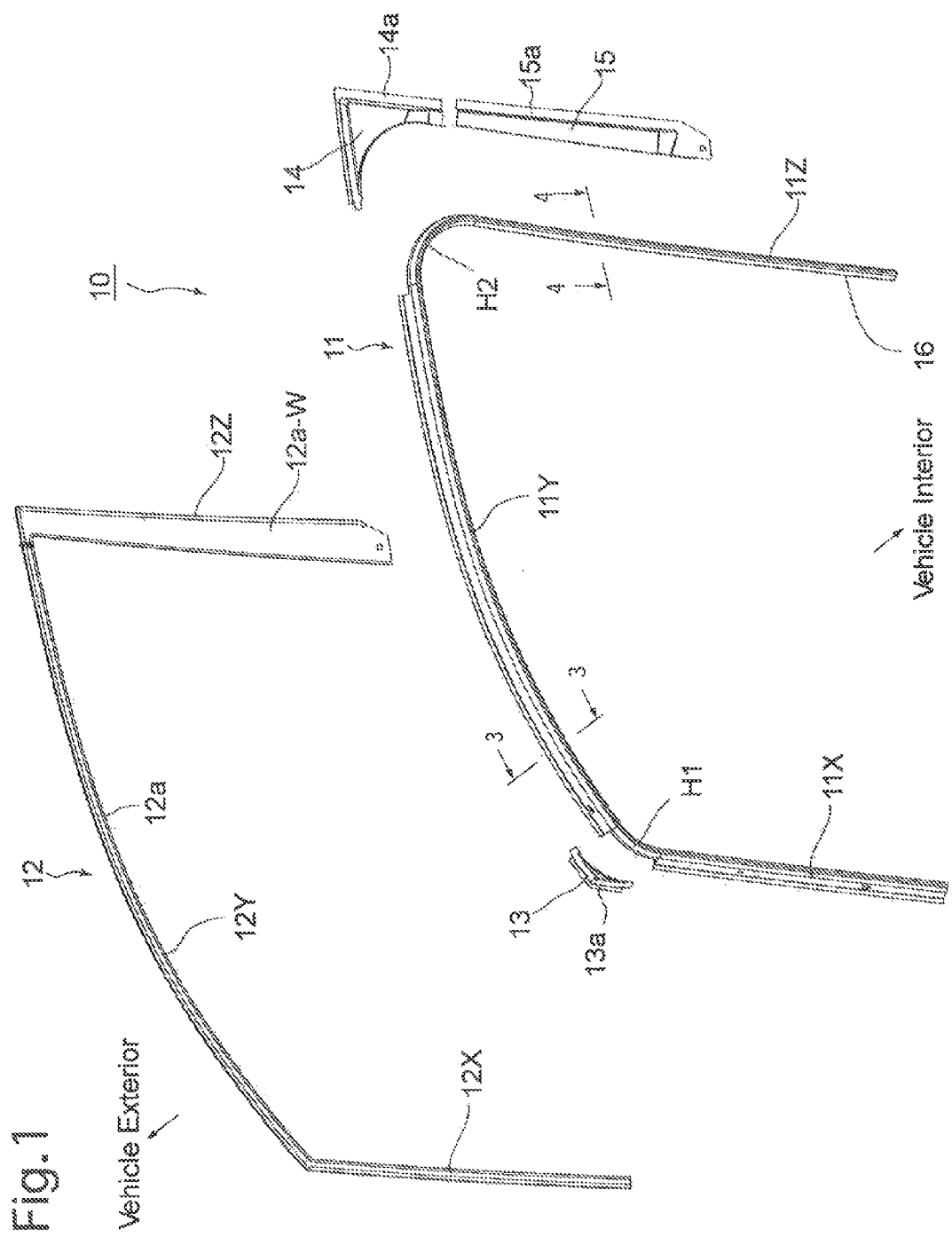
FIG. 1 is an exploded perspective view a door frame to which the present invention has been applied.
Figure 9:
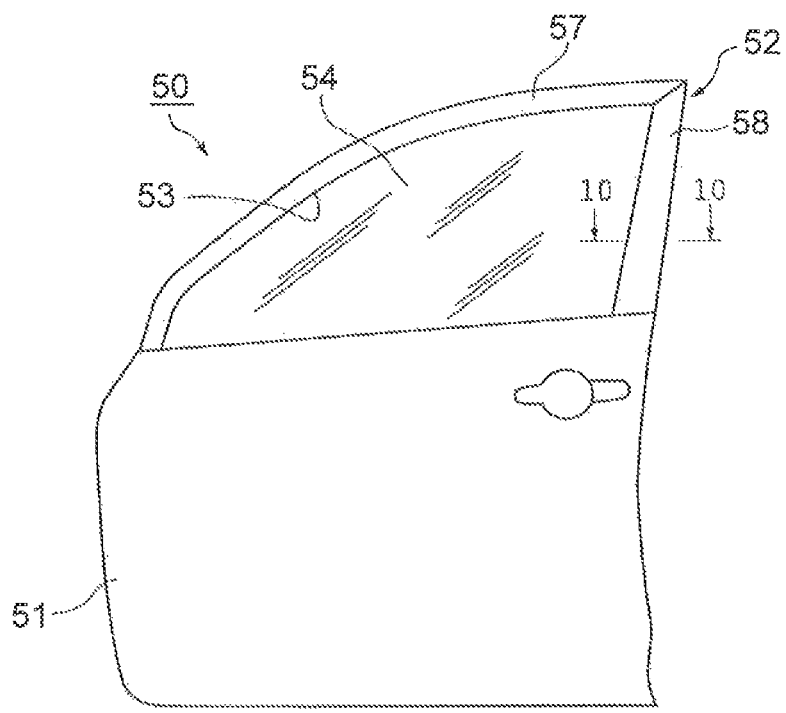
FIG. 9 is a diagram showing an outline structure of a vehicle door.

A door frame 10 that is shown in FIG. 1 in an exploded state is a portion corresponding to the door frame 52 of the door 50 that has been described above with reference to FIG. 9. The door frame 10 is applied to a front right door of a passenger vehicle. The door frame 10 is composed of an inner frame (frame body) 11, an exterior member 12, a front corner patch 13, a rear corner patch 14 and a reinforcement member 15.

The inner frame 11 is formed of a sheet metal material; firstly formed into a linear member having the cross sectional shape shown in FIGS. 2 through 4 by roll forming process, and subsequently deformed by bending at a front corner portion H1 and a rear corner portion H2 at intermediate points in the lengthwise direction to form a front side sash portion 11X, an upper sash side portion 11Y and a rear side sash portion 11Z. The area surrounded by the front side sash portion 11X, the upper sash side portion 11Y and the rear side sash portion 11Z is defined as a window opening 16 in which a door glass G (FIGS. 3 and 4) is moved up and down. In the following descriptions, the side of the inner frame 11 which faces the window opening 16 is referred to as the inner periphery of the inner frame 11 (the door frame 10) and the opposite side of the inner frame 11 from the inner periphery thereof is referred to as the outer periphery of the inner frame 11. After the completion of the door frame 10, the lower parts of the front side sash portion 11X and the rear side sash portion 11Z are fixed to a door panel not shown in the drawings.

Figure 2:
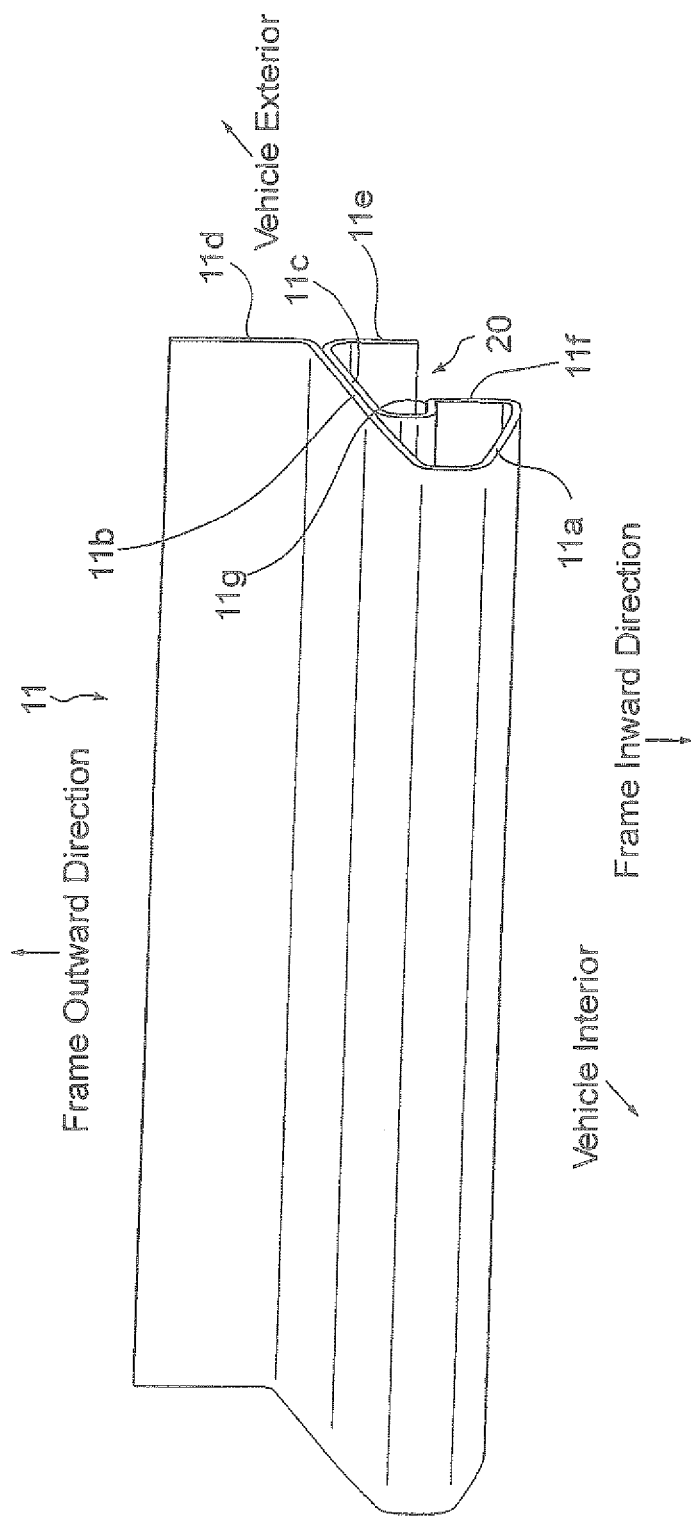
FIG. 2 is a perspective view showing a cross sectional shape of a portion of an inner frame which serves as an element of the door frame shown in FIG. 1.
Figure 3:
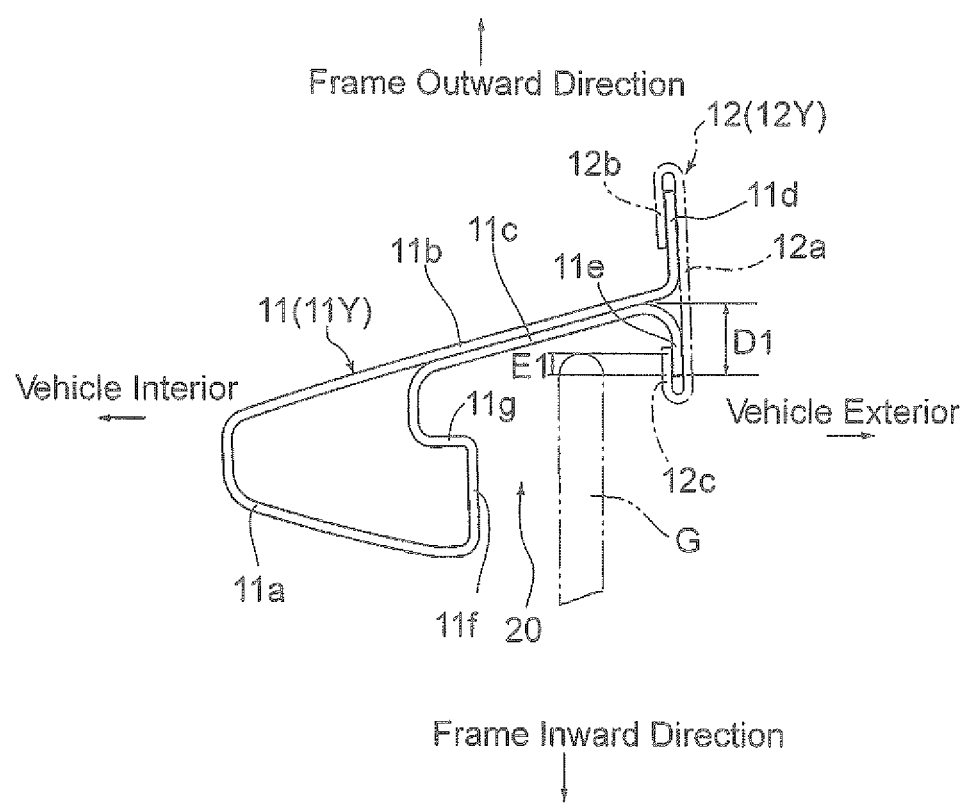
FIG. 3 is a cross sectional view of the upper sash portion of the inner frame, taken along the line 3-3 shown in FIG. 1.
Figure 4:
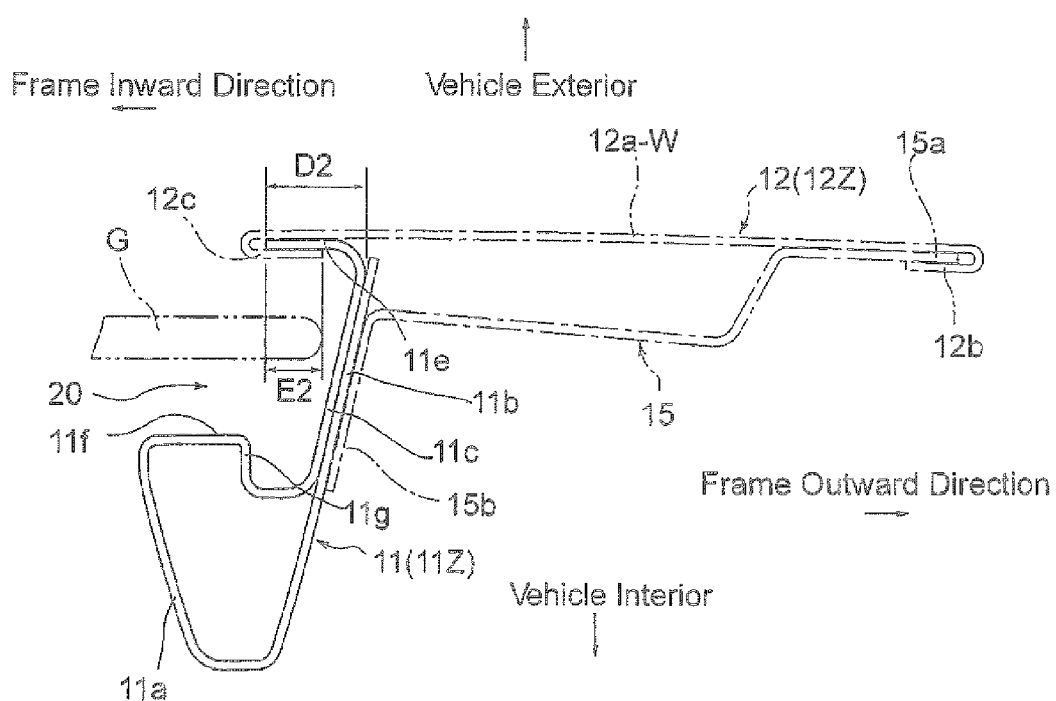
FIG. 4 is a cross sectional view of the rear side sash portion of the inner frame, taken along the line 4-4 shown in FIG. 1.
Figure 10:
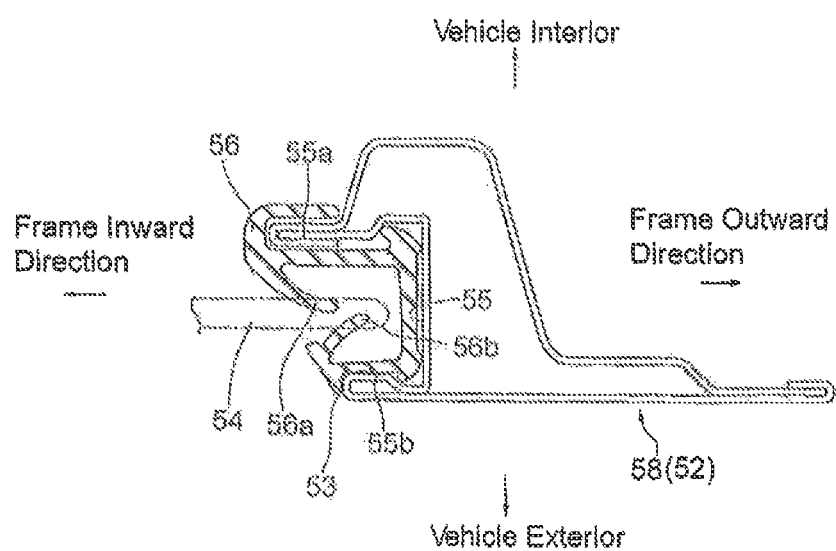
FIG. 10 is a cross sectional view taken along the line 10-10 shown in FIG. 9, showing an example of a conventional door frame.

As shown in FIGS. 2 through 4, the inner frame 11 is provided with a tubular portion 11a having a closed cross sectional shape which is positioned on the vehicle interior side; a pair of planate portions (glass-opposing portion) 11b and 11c which extend toward the vehicle exterior side in a direction substantially parallel to the tubular portion 11a; an outer-periphery design portion 11d which is formed by bending the end of the planate portion 11b on the vehicle exterior side toward the outer periphery of the inner frame 11; and an inner-periphery design portion (glass guide portion formation area in the design portion) 11e which is formed by bending the end of the planate portion 11c on the vehicle exterior side toward the inner periphery of the inner frame 11. In other words, the inner frame 11 has a structure such that the tubular portion 11a, which is positioned on the vehicle interior side, and the design portions 11d and 11e, which are positioned on the vehicle exterior side, are connected to each other via the planate portions 11b and 11c, respectively, that are opposed to an outer edge of the door glass G. Part of the tubular portion 11a constitutes an upright wall portion 11f which faces the inner-periphery design portion 11e, and a concave-shaped cross sectional portion which is open toward the inner periphery of the inner frame 11 (to the window opening 16) constitutes the glass guide portion 20 with the inner-periphery design portion 11e and the upright wall portion 11f as side walls and with the planate portion 11c as the base surface. Although not shown in the drawings, a glass run made of an elastic material is held in the glass guide portion 20. Similar to the glass run 56 shown in FIG. 10, this glass run has lips which elastically hold, from the vehicle interior side and the vehicle exterior side, both sides of an edge of the door glass G which has entered the glass guide portion 20. A stepped portion 11g is formed on the upright wall portion 11f as a retainer which retains the glass run.

Figure 5:
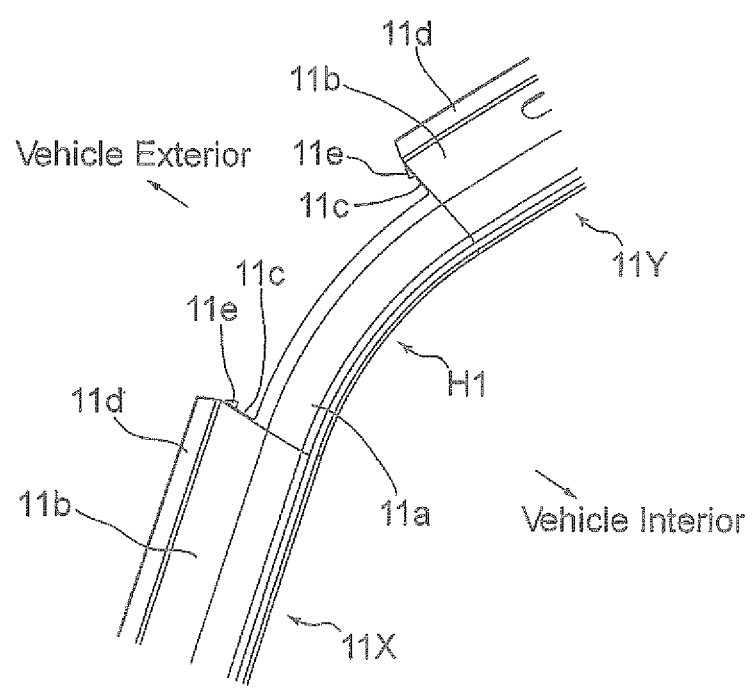
FIG. 5 is an enlarged perspective view of a front corner portion of the inner frame.
Figure 7:
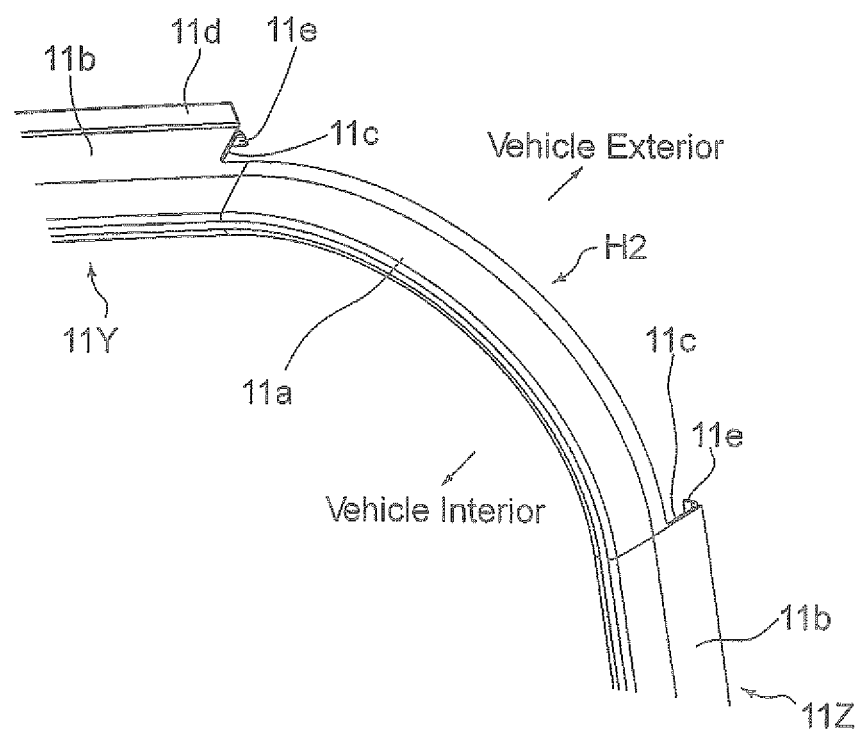
FIG. 7 is an enlarged perspective view of the rear corner portion of the inner frame.

As shown in FIGS. 2, 3 and 5, in the front side sash portion 11X and the upper sash portion 11Y of the inner frame 11, the outer-periphery design portion 11d and the inner-periphery design portion 11e are aligned to be substantially flush with each other so as to constitute a design portion which faces toward the vehicle external side. On the other hand, in the rear side sash portion 11Z, the outer-periphery design portion 11d is cut out, as shown in FIGS. 4 and 7; instead, an outer-periphery design portion 15a (FIG. 4) of the reinforcement member 15 and the inner-periphery design portion 11e constitute a design portion which faces toward the vehicle exterior side. As shown in FIG. 4, the reinforcement member 15 is provided with a support plate portion 15b which extends along the planate portion 11b of the inner frame 11, and the outer-periphery design portion 15a faces toward the vehicle exterior side at a position away from the inner-periphery design portion 11e with the support plate portion 15b fixed to the planate portion 11b.

As shown in FIGS. 5 and 7, in the inner frame 11, the design portion (the outer-periphery design portion 11d and the inner-periphery design portion 11e) and a part of the planate portions 11b and 11c are cut out at each of the front corner portion H1, which corresponds to the boundary between the front side sash portion 11X and the upper sash portion 11Y, and the rear corner portion H2, which corresponds to the boundary between the upper sash portion 11Y and the rear side sash portion 11Z, so that only the entire part of the tubular portion 11a and part of the planate portions 11b and 11c remain. This cutting out of the design portion is carried out after bending process for forming each corner portion H1 and H2 is performed on the inner frame 11, thereby removing improperly deformed portions such as wrinkles created by the aforementioned bending process. Since the tubular portion 11a remains at each corner portion H1 and H2, the inner frame 11 as a whole can secure a sufficient strength even if the design portion is cut out.

Figure 8:
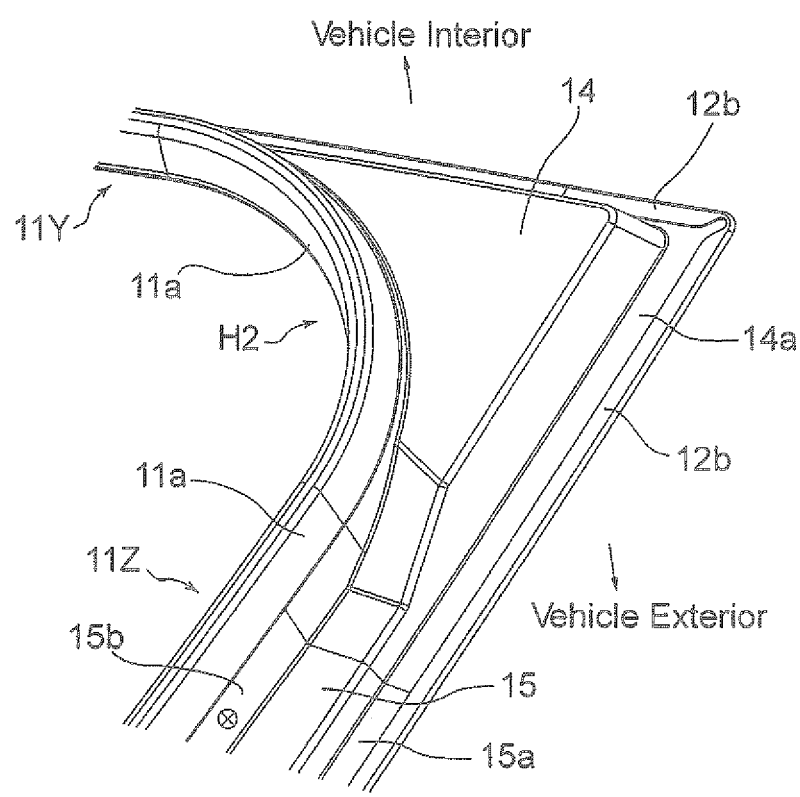
FIG. 8 is an enlarged perspective view of a portion of the door frame in the vicinity of the rear corner portion in a completed state of the door frame.

The front corner patch 13 and the rear corner patch 14 are installed to the front corner portion H1 and the rear corner portion H2 of the inner frame 11, respectively. The front corner patch 13 is provided with a connection design portion 13a (partly shown in FIGS. 1 and 6) which is substantially flush with the outer-periphery design portion 11d and the inner-periphery design portion 11e of the inner frame 11 in a state where the front corner patch 13 is fixed to the front corner portion H1. The rear corner patch 14 is provided with a connection design portion 14a (partly shown in FIGS. 1 and 8) which is substantially flush with the inner-periphery design portion 11e of the inner frame 11 and the outer-periphery design portion 15a of the reinforcement member 15 in a state where the rear corner patch 14 is fixed to the rear corner portion H2.

The exterior member 12 for covering these design portions is installed in a state where each corner patch 13 and 14 and the reinforcement member 15 are installed to the inner frame 11 as described above. As shown in FIG. 1, the exterior member 12 is provided with a front side portion 12X, an upper portion 12Y and a rear side portion 12Z which are formed to correspond to the front side sash portion 11X, the upper sash portion 11Y and the rear side sash portion 11Z of the inner frame 11, respectively. The exterior member 12 is brought into contact with the design portions (11d, 11e, 13a, 14a and 15a) of the inner frame 11, the front and rear corner patches 13 and 14 and the reinforcement member 15 from the vehicle external side and fixed thereto by hemming, in which both edges of the exterior member 12 are folded back toward the vehicle interior side.

Specifically, the exterior member 12 is formed so that the rear side portion 12Z is greater in width than the front side portion 12X and the upper portion 12Y. As shown in FIG. 3, the upper portion 12Y of the exterior member 12 is joined to the upper sash portion 11Y of the inner frame 11 by clamping the outer-periphery design portion 11d and the inner-periphery design portion 11e with hemmed portions 12b and 12c, respectively, which are formed by folding back the outer and inner peripheral edges of a design surface 12a toward the vehicle interior side with the design surface 12a brought in contact with vehicle external side surfaces of the outer-periphery design portion 11d and the inner-periphery design portion 11e. Although a detailed cross sectional shape is omitted, the joining structure of the front side portion 12X of the exterior member 12 to the front side sash portion 11X is similar to this joining structure (see FIG. 6). The folding-back amount (width) of each hemmed portion 12b and 12c in each of the front side portion 12X and the upper portion 12Y is substantially constant over the exterior member 12 in the lengthwise direction thereof. Alternatively the folding-back amount (width) of the hemmed portion 12b and (or) the hemmed portion 12c in the front side portion 12X and (or) the upper portion 12Y may be varied in the lengthwise direction of the exterior member 12.

As shown in FIG. 4, the rear side portion 12Z of the exterior member 12 is joined to the inner frame 11 by clamping the inner-periphery design portion 11e with the hemmed portion 12c that is formed by folding the inner peripheral edge of a wide design surface 12a-W back toward the vehicle interior side with the wide design surface 12a-W brought in contact with vehicle external side surfaces of the outer-periphery design portion 15a of the reinforcement member 15 and the inner-periphery design portion 11e of the inner frame 11 so as to extend over these vehicle external side surfaces. On the other hand, the rear side portion 12Z of the exterior member 12 is joined to the reinforcement member 15 by clamping the outer-periphery design portion 15a with the hemmed portion 12b that is formed by folding back the outer peripheral edge of the wide design surface 12a-W toward the vehicle interior side. The folding-back amount (width) of each hemmed portion 12b and 12c in the rear side portion 12Z is substantially constant over the exterior member 12 in the lengthwise direction thereof, however the folding-back amount (width) of the hemmed portion 12b and (or) the hemmed portion 12c in the rear side portion 12Z can vary.

Figure 6:
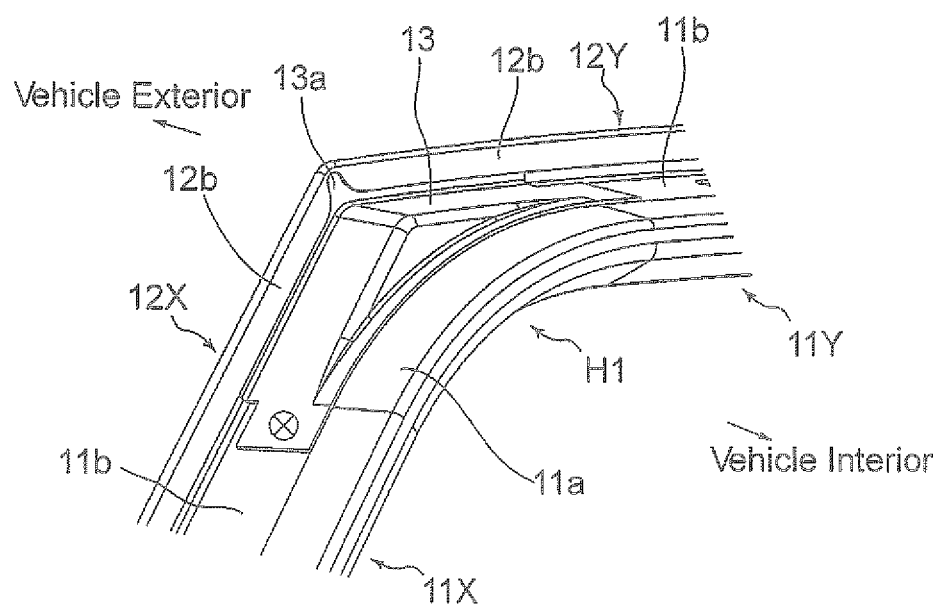
FIG. 6 is an enlarged perspective view of a portion of the door frame in the vicinity of the front corner portion in a completed state of the door frame.

Additionally, in the front corner portion H1, the exterior member 12 and the front corner patch 13 are joined to each other by clamping the connection design portion 13a of the front corner patch 13 with the hemmed portions 12b and 12c of each of the front side portion 12X and the upper portion 12Y (see FIG. 6). In the rear corner portion H2, the exterior member 12 and the rear corner patch 14 are joined to each other by clamping the connection design portion 14a of the rear corner patch 14 with the hemmed portions 12b and 12c of each of the upper portion 12Y and the rear side portion 12Z (see FIG. 8).

As described above, since the door frame 10 has a structure such that the basic form of the door frame is configured by the inner frame 11, which is composed of a single member, over the whole of the front and rear side sash portions and the upper sash portion and that only the outer surface of the design portion of the door frame 10 is covered by the exterior member 12, the door frame 10 can be easily assembled and produced at low cost and is superior in strength compared with a structure in which separate frame members are joined to each other at a door corner portion.

In the inner frame 11, the outer-periphery design portion 11d and the inner-periphery design portion 11e are cut out at the front corner portion H1 and the rear corner portion H2 and the outer-periphery design portion 11d is cut out at the rear side sash portion 11Z; however, other parts of the inner frame 11, especially the tubular portion 11a basically has a uniform cross sectional shape over the entirety of the inner frame 11 in the lengthwise direction thereof. Whereas, as for the inner-periphery design portion 11e that constitutes a side wall of the glass guide portion 20 on the vehicle exterior side, the width (amount of projection from the planate portion 11c in a direction toward the inner periphery of the frame) D2 in the rear side sash portion 11Z is set to be greater than the width (amount of projection from the planate portion 11c in a direction toward the inner periphery of the frame) D1 in the upper sash portion 11Y as can be seen from a comparison between FIGS. 3 and 4. Due to this difference between the width D1 and the width D2, the overlapping width E1 between the door glass G which enters the glass guide portion 20 and the inner-periphery design portion 11e in the upper sash portion 11Y, and the overlapping width E2 between the door glass G which enters the glass guide portion 20 and the inner-periphery design portion 11e in the rear side sash portion 11Z are mutually different, i.e., the condition E1<E2 is attained. In other words, since the inner-periphery design portion 11e constitutes one side wall of the glass guide portion 20, the width (E2) for holding the door glass G by the glass guide portion 20 in the rear side sash portion 11Z becomes greater than the width (E1) for holding the door glass G by the glass guide portion in the upper sash portion 11Y. With this structure, the installation of the glass run (not shown) to the glass guide portion 20 increases the holding strength for the door glass G to thereby make it possible to reliably prevent the door glass G from vibrating and rattling in the rear side sash portion 11Z. On the other hand, in the upper sash portion 11Y, the width of inner-periphery design portion 11e is reduced, which makes it possible to narrow the design portion, thereby increasing the degree of freedom in design of the door frame 10. Since the door glass G is in the fully closed state when the upper edge of the door glass G enters the glass guide portion 20 of the upper sash portion 11Y, the door glass G can be held with a narrow holding width (E1) with a sufficient degree of stability, unlike the rear side sash portion 11Z that is required to hold the door glass G even in a half-open state thereof.

As a technique for making the inner-periphery design portion 11e of the upper sash portion 11Y and the inner-periphery design portion 11e of the rear side sash portion 11Z different in width from each other, it is possible to first form the inner-periphery design portion 11e of the entire inner frame 11 with the wide width D2 for the rear side sash portion 11Z and thereafter cut out a part of the inner-periphery design portion 11e in the widthwise direction thereof to form the inner-periphery design portion 11e with the narrow width D1 for the upper sash portion 11Y. Alternatively, it is possible to first form the inner-periphery design portion 11e of the entire inner frame 11 with the narrow width D1 for the upper sash portion 11Y and thereafter add a width-widening part thereto to form the inner-periphery design portion 11e with the wide width D2 for the rear side sash portion 11Z. From the viewpoint of productivity and strength, it is desirable to adopt the former technique, in which the wide-width design portion is partly cut out.

The width of the inner periphery design portion 11e can be made to be substantially uniform or vary gradually within the range of each of the front side sash portion 11X, the upper sash portion 11Y and the rear side sash portion 11Z.

In addition, it is possible to provide variations to the width of the design portion of the inner frame 11 by partly cutting out the outer-periphery design portion 11d instead of the inner-periphery design portion 11e.

Although described above based on the illustrated embodiment, the present invention is not limited to this embodiment. For instance, although the inner frame 11 includes the front side sash portion 11X that bends at the front corner portion H1 with respect to the upper sash portion 11Y in the present embodiment of the door frame 10, the present invention can also be applied to a type of door frame in which the inner frame includes no bent portion corresponding to the front corner portion H1 and in which the upper sash portion is gently curved to be connected to a door panel.

Additionally, although the reinforcement member 15 that is a separate member from the inner frame 11 is used for the formation of a design portion at the rear side sash portion 11Z of the inner frame 11 in the present embodiment, it is possible to form the design portion solely by the inner frame 11 in a similar manner to the upper sash portion 11Y. More specifically, it is possible to leave the outer-periphery design portion 11d without cutting out the rear side sash portion 11Z to form the design portion from the outer-periphery design portion 11d and the inner-periphery design portion 11e.

Additionally, although the tubular portion 11a of the inner frame 11 of the present embodiment is formed to have a closed cross section, the present invention can also be applied to a door frame provided with a tubular portion having no closed cross section.

INDUSTRIAL APPLICABILITY

As described above in detail, the present invention relates to a door frame structure applied to a vehicle such as an automobile and a method of producing the door frame, and a reduction in production cost, an improvement in productivity and an improvement in strength of the door frame can be achieved by forming the body of the door frame from a frame body consisting of a single member which is continuous from the upper sash portion to the side sash portion. In addition, the degree of freedom in vehicle design can be increased by setting an appropriate width of the design portion at each portion of the frame by making the width of the design portion in the frame body vary at at least one point in the lengthwise direction of the design portion.

DESCRIPTION OF THE REFERENCE NUMERALS

10 Door frame
11 Inner frame (frame body)
11a Tubular portion
11b 11c Planate portion (glass-opposing portion)
11d Outer-periphery design portion
11e Inner-periphery design portion (glass guide portion formation area in a design portion)
11f Upright wall portion
11g Stepped portion
11X Front side sash portion
11Y Upper sash portion 11Z Rear side sash portion
12 Exterior member
12a 12a-W Design surface
12b 12c Hemmed portion
12X Front side portion
12Y Upper portion
12Z Rear side portion
13 Front corner patch
13a Connection design portion
14 Rear corner patch
14a Connection design portion
15 Reinforcement member
15a Outer-periphery design portion
15b Support plate portion
16 Window opening
20 Glass guide portion
G Door glass
H1 Front corner portion
H2 Rear corner portion

The invention claimed is:

1. A method of producing a vehicle door frame which includes an upper sash portion that holds an upper edge of an upward and downward movable door glass, a side sash portion that holds a side edge of said door glass and a corner portion positioned at a boundary between said upper sash portion and said side sash portion, said method comprising:
    forming a frame body which is continuous from said upper sash portion to said side sash portion by forming a linear member from a metal plate which has a length extending at least from said upper sash portion to said side sash portion so that said linear member has an uniform cross sectional shape which includes a glass-opposing portion that is opposed to said side edge of said door glass,
    a design portion that is positioned on one side of said glass-opposing portion on a vehicle exterior side,
    a tubular portion that is positioned on another side of said glass-opposing portion on a vehicle interior side,
    and a glass guide portion which is defined by said glass-opposing portion, said design portion and said tubular portion so that said glass guide portion has a concave-shaped cross section thereafter creating said corner portion by bending said linear member at said boundary between the upper sash portion and the side sash portion;
    performing a process of making a width of said design portion of said frame body vary in at least one area along a length of said design portion after said forming said frame body; and thereafter
    covering said design portion of said frame body with an exterior member from said vehicle exterior side,
    wherein the width of said design portion is varied by cutting off an area of said design portion.

2. The method of producing the vehicle door frame of claim 1, wherein said area of said design portion is cut off from said upper sash portion.

3. The method of producing the vehicle door frame of claim 1, wherein said side sash portion comprises a front side sash portion which is provided on a front side of said upper sash portion, and a rear side sash portion which is provided on a rear side of said upper sash portion;
    said method additionally comprises forming a front corner portion by a bending process, in an area defined between said front side sash portion and said upper sash portion; and
    said method additionally comprises forming a rear corner portion by a bending process, in an area defined between said rear side sash portion and said upper sash portion.

4. The method of producing the vehicle door frame of claim 3, wherein said design portion comprises an outer periphery design portion and an inner periphery design portion,
    wherein said outer periphery design portion is cut off at said rear side sash portion to define a cut-off portion thereat, and
    wherein a reinforcement member is provided in said cut off portion.

5. The method of producing the vehicle door frame of claim 3, wherein a part of said design portion and a part of said glass-opposing portion are cut off at each of said front corner portion and said rear corner portion, to define a cut-off portion thereat, and
    wherein a corner patch is mounted at each said cut-off portion.

6. The method of producing the vehicle door frame of claim 1, wherein said exterior member covers substantially an entirety of said design portion in accordance with the width thereof.

7. A method of producing a vehicle door frame which includes an upper sash portion that holds an upper edge of an upward and downward movable door glass, a side sash portion that holds a side edge of said door glass and a corner portion positioned at a boundary between said upper sash portion and said side sash portion, said method comprising:
    forming a frame body which is continuous from said upper sash portion to said side sash portion by forming a linear member from a metal plate which has a length extending at least from said upper sash portion to said side sash portion so that said linear member has an uniform cross sectional shape which includes a glass-opposing portion that is opposed to said side edge of said door glass,
    a design portion that is positioned on one side of said glass-opposing portion on a vehicle exterior side,
    a tubular portion that is positioned on another side of said glass-opposing portion on a vehicle interior side,
    and a glass guide portion which is defined by said glass-opposing portion, said design portion and said tubular portion so that said glass guide portion has a concave-shaped cross section thereafter creating said corner portion by bending said linear member at said boundary between the upper sash portion and the side sash portion;
    performing a process of making a width of said design portion of said frame body vary in at least one area along a length of said design portion after said forming said frame body; and thereafter
    covering said design portion of said frame body with an exterior member from said vehicle exterior side,
    wherein said design portion comprises an outer periphery design portion and an inner periphery design portion,
    wherein said outer periphery design portion is cut off at a rear side sash portion provided on a rear side of said upper sash portion to define a cut-off portion thereat, and
    wherein a reinforcement member is provided in said cut off portion.

8. A method of producing a vehicle door frame which includes an upper sash portion that holds an upper edge of an upward and downward movable door glass, a side sash portion that holds a side edge of said door glass and a corner portion positioned at a boundary between said upper sash portion and said side sash portion, said method comprising:
    forming a frame body which is continuous from said upper sash portion to said side sash portion by forming a linear member from a metal plate which has a length extending at least from said upper sash portion to said side sash portion so that said linear member has an uniform cross sectional shape which includes a glass-opposing portion that is opposed to said side edge of said door glass, a design portion that is positioned on one side of said glass-opposing portion on a vehicle exterior side, a tubular portion that is positioned on another side of said glass-opposing portion on a vehicle interior side, and a glass guide portion which is defined by said glass-opposing portion, said design portion and said tubular portion so that said glass guide portion has a concave-shaped cross section thereafter creating said corner portion by bending said linear member at said boundary between the upper sash portion and the side sash portion;

performing a process of making a width of said design portion of said frame body vary in at least one area along a length of said design portion after said forming said frame body; and thereafter covering said design portion of said frame body with an exterior member from said vehicle exterior side, wherein said side sash portion comprises a front side sash portion which is provided on a front side of said upper sash portion, and a rear side sash portion which is provided on a rear side of said upper sash portion;

said method additionally comprises forming a front corner portion by a bending process, in an area defined between said front side sash portion and said upper sash portion, and said method additionally comprises forming a rear corner portion by a bending process, in an area defined between said rear side sash portion and said upper sash portion, wherein a part of said design portion and a part of said glass-opposing portion are cut off at each of said front corner portion and said rear corner portion, to define a cut-off portion thereat, and wherein a corner patch is mounted at each said cut-off portion.

* * * * *